April 3, 1945.                    J. E. DUGGAN                    2,372,888
                                  NUT STRUCTURE
                              Filed April 20, 1944
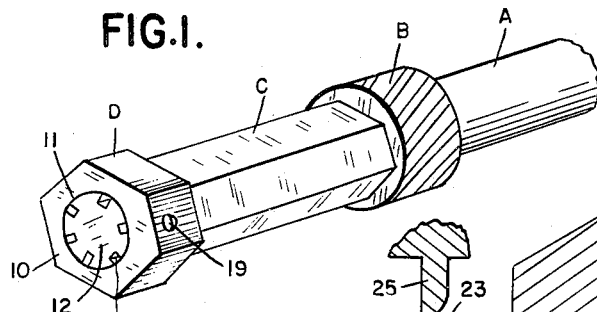
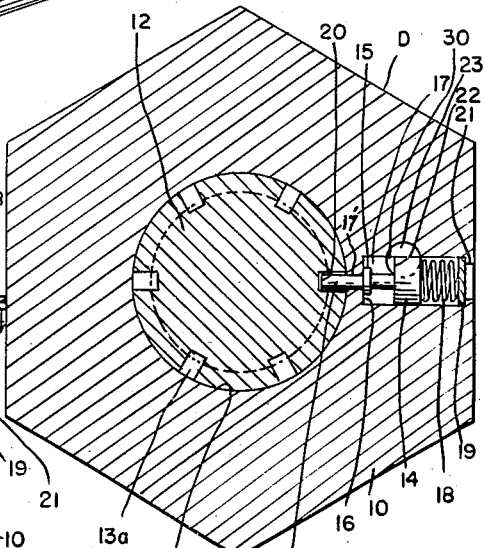
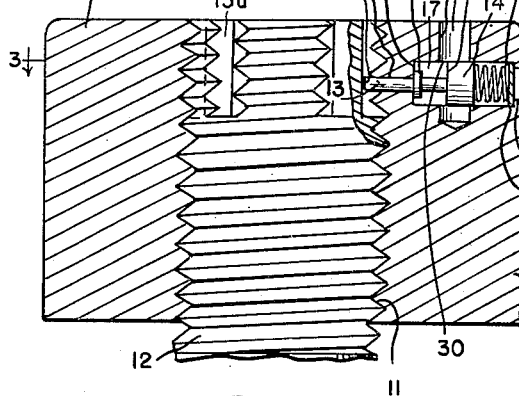
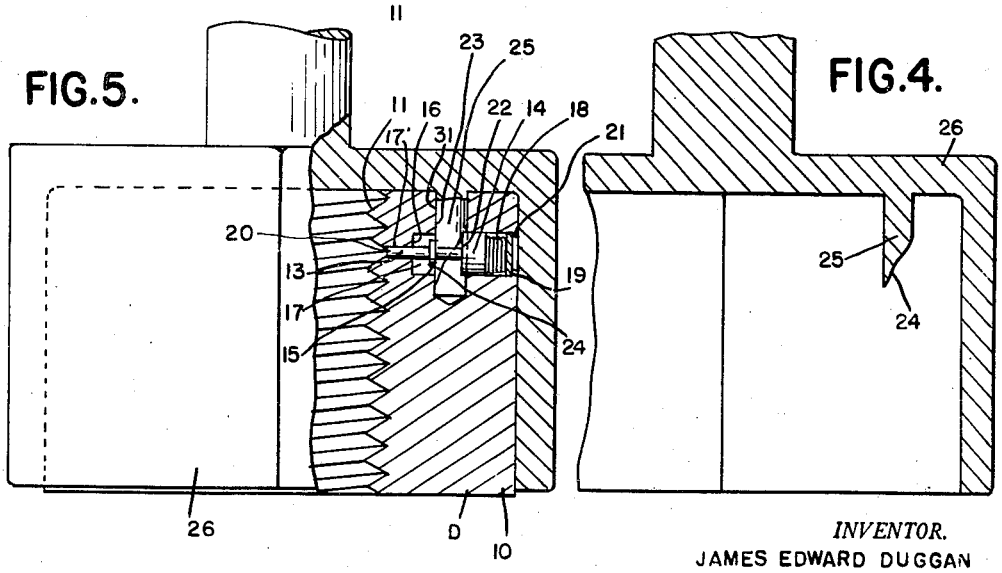
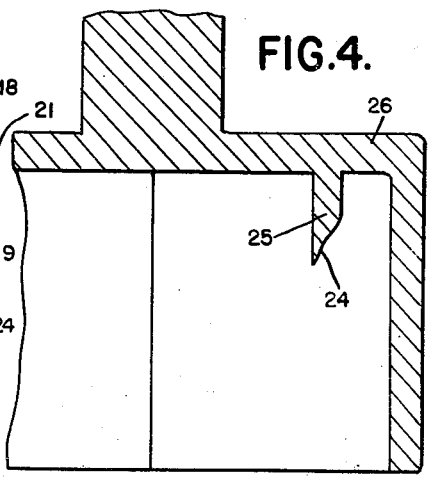
INVENTOR.
JAMES EDWARD DUGGAN
BY
*Whittemore, Hulbert & Belknap*
ATTORNEYS Patented Apr. 3, 1945

2,372,888

UNITED STATES PATENT OFFICE 2,372,888

NUT STRUCTURE

James Edward Duggan, Birmingham, Mich.

Application April 20, 1944, Serial No. 531,962

3 Claims. (Cl. 151—6)

This invention relates generally to nut structures and refers more particularly to self-locking nut structures.

One of the essential objects of the invention is to provide a nut structure adapted for use on cutter shafts of milling or other metal working machines, where vibration occurs during operation thereof, to maintain a proper assembly of parts without loosening up or backing off the shafts while subjected to such vibration.

Another object is to provide a nut structure wherein normally inaccessible locking means is provided in the body of the nut for movement relative thereto to effect automatically a tight connection with the shaft, bolt or other element upon which such nut structure may be mounted.

Another object is to provide a nut structure wherein the body of the nut is provided with a suitable access opening through which a suitable cam-like projection of a socket wrench or other tool for adjusting the nut may be inserted to release the normally inaccessible locking means and thereby permit the nut to be adjusted freely on the shaft or other element mentioned. Thus, the nut may be locked in position and released at any time.

Another object is to provide a nut structure that is simple in construction, economical to manufacture and efficient in operation.

Other objects, advantages and novel details of construction of this invention will be made more apparent as this description proceeds, especially when considered in connection with the accompanying drawing, wherein:

Figure 1 is a fragmentary perspective view of a cutter shaft of a milling machine and showing a nut structure embodying my invention applied thereto;

Figure 2 is a vertical sectional view through the nut structure and showing the threaded portion of a bolt applied thereto with a part of the socket wrench disposed above the socket 23 and shown in section;

Figure 3 is a horizontal sectional view taken substantially on the line 3—3 of Figure 2;

Figure 4 is a fragmentary detail view of the socket wrench;

Figure 5 is a view showing the application of the socket wrench to the nut structure.

Referring now to the drawing, A is a rotating shaft provided with a cutter B, a tubular spacer C and a nut structure D embodying my invention. As shown, the shaft A, cutter B and spacer C may constitute parts of any metal working machine, such as a milling machine, and may be of any suitable construction.

The nut structure D embodying my invention preferably comprises a polygonal body 10 having a centrally located interiorly threaded hole 11 for the reception of a threaded end portion 12 of the shaft and having at one side of the hole a spring pressed plunger 13 for interlocking engagement with longitudinally extending grooves or slots 13a in the threaded portion 12 of the shaft.

Preferably the plunger 13 is provided at its inner end with an enlarged portion or head 14 and is provided substantially midway its ends with an annular flange 15 for abutting engagement with the inner end 16 of a recess 17 for said head.

In the present instance, the recess 17 extends laterally outward through the body 10 and contains a coil spring 18 that is disposed between and terminally engages a cap or closure 19 at the outer end of the recess and the head 14 of the plunger, and normally urges the latter inwardly so that the flange 15 abuts the inner end 16 of the recess, and the inner end portion 20 of the plunger projects through a hole 17' in the inner end 16 of the recess 17 into the threaded hole 11 of the body portion for operative locking engagement with the threaded portion 12 of the shaft. The outer edges 21 of the recess 17 are peened over the cap 19 to hold the parts in assembled relation.

To enable the plunger 13, which normally is inaccessible in the body portion 10, to be retracted or released from the slots 13a in the shaft, I have provided in the body portion 10 of the nut, preferably in slightly offset relation to the forward or inner end 22 of the head 14 of the plunger, a socket 23 for the reception of a cam or wedge-like end portion 24 of a projection 25 of a socket wrench 26 for the nut.

Thus, when the socket wrench 26 is applied to the nut to turn the same relative to the shaft, the cam-like end portion 24 of the projection 25 of the wrench will enter the space 30 between the inner wall 31 of the socket 23 and the inner end 22 of the head 14 of the plunger and will force the plunger rearwardly to a retracted unlocked position relative to the threaded portion 12 of the shaft to permit the socket wrench to turn freely the nut on the shaft.

When the socket wrench 26 is removed from the nut, the cam-like portion 24 of the projection will be withdrawn from the head 14 of the plunger, hence the plunger will be moved automatically by the spring 18 to its projected position, as illustrated in Figure 2.

In use, when it is desired to apply the nut to the shaft, the socket wrench 26 is used as aforesaid. This releases the plunger 13 and enables the nut to be tightened by the wrench upon the shaft. When the desired adjusted position is reached the socket wrench is removed from the nut thereby causing the plunger 13 to be projected automatically by the spring 18 into locking relation with the slots 13a in the shaft to hold the nut in such adjusted position and thereby prevent it from loosening up or backing off the shaft.

What I claim as my invention is:

1. A nut structure comprising a nut having a polygonal body provided with an axially extending opening for receiving a shaft, an outwardly opening recess extending substantially at right angles to but terminating short of said opening, the inner end of said recess having a hole therein extending to said opening, and an outwardly opening socket crossing and slightly offset relative to the recess for the reception of an unlocking wedge-like portion of a socket wrench for the nut, a plunger extending through the hole aforesaid for interlocking engagement with the shaft, said plunger being provided at longitudinally spaced points thereof within the recess aforesaid with a flange and a head, the flange being engageable with the inner end of the recess to limit movement of the plunger into the opening aforesaid and to locate the head relative to the socket so that a space is provided therebetween for the reception of the unlocking wedge-like portion aforesaid, a fixed element within the recess at the outer end thereof in spaced relation to said head, and a coil spring within said recess between the fixed element and head urging the plunger into the opening aforesaid in said nut.

2. A nut structure comprising a nut having a polygonal body provided with an axially extending opening for receiving a shaft, an outwardly opening recess extending substantially at right angles to but terminating short of said opening, the inner end of said recess having a hole therein extending to said opening, and an outwardly opening socket crossing and slightly offset relative to the recess for the reception of an unlocking part of a socket wrench for the nut, and a spring pressed plunger extending through the hole aforesaid for interlocking engagement with the shaft, said plunger being provided at longitudinally spaced points thereof within the recess aforesaid with a flange and a head, the flange being engageable with the inner end of the recess to limit movement of the plunger into the opening aforesaid and to locate the head relative to the socket so that a space is provided therebetween for the reception of the unlocking part aforesaid of the socket wrench.

3. A nut structure comprising a nut having a polygonal body provided with an axially extending opening for receiving a shaft, an outwardly opening recess extending substantially at right angles to but terminating short of said opening, the inner end of said recess having a hole therein extending to said opening, and an outwardly opening socket crossing and slightly offset relative to the recess for the reception of an unlocking part of a socket wrench for the nut, a spring pressed plunger extending through the hole aforesaid for interlocking engagement with the shaft, said plunger being provided at longitudinally spaced points thereof within the recess aforesaid with a flange and a head, the flange being engageable with the inner end of the recess to limit movement of the plunger into the opening aforesaid and to locate the head relative to the socket so that a space is provided therebetween for the reception of the unlocking part aforesaid of the socket wrench, a closure for the recess at the outer end thereof in spaced relation to said head, and means within said recess between the closure and head urging the plunger into the opening aforesaid in said nut.

JAMES EDWARD DUGGAN.